United States Patent Office 3,244,479
Patented Apr. 5, 1966

3,244,479
METHOD OF CATALYTICALLY PRODUCING HYDROGEN CYANIDE AND REGENERATING THE CATALYST THEREFOR IN SITU
Bingham Y. K. Pan, Texas City, and Robert G. Roth, Dickinson, Tex., assignors to Monsanto Company, a corporation of Delaware
No Drawing. Filed May 21, 1962, Ser. No. 196,428
3 Claims. (Cl. 23—151)

The present invention relates to an improved process for the synthesis of hydrogen cyanide. More particularly, it relates to the reactivation or regeneration of platinum-containing gauze catalysts employed in the production of hydrogen cyanide by reaction of a nitrogen-containing gas, a hydrocarbon and an oxygen-containing gas.

Among the methods presently known for the preparation of hydrogen cyanide, the more widely accepted are those in which a nitrogen-containing gas, a hydrocarbon, and an oxygen-containing gas are reacted in the presence of a catalyst. Of these, the commercial process offering the most advantages is that in which the reactants are ammonia, natural gas and air. The catalyst generally employed in this process is one comprised of some form of platinum or its alloys. The metallic catalyst is employed either as a coating on various substrates or in unsupported form as plates, spirals, woven wire gauzes and the like. A catalyst having many superior qualities is one consisting of fine gauze woven from wire made from platinum containing from 2 to 50% rhodium and usually about 10% rhodium. Various techniques for installation of the gauze catalyst in the reactor have been developed such as the use of one or more layers of flat pieces of gauze, flat gauzes supported on grids, cylindrical type gauzes, multi-layered conical structures of gauze and the like.

In the reaction of ammonia, natural gas and air with all such gauze catalysts, the yield of hydrogen cyanide from ammonia as observed over a period of continuous operation reaches a peak and thereafter falls off until it is no longer economical to use the catalyst in its spent condition. In ordinary operations, as soon as the decrease in yield is in the neighborhood of 7–10%, the process becomes uneconomical. In the prior art practice when this stage of operation is reached, the reaction is stopped and the spent catalyst is replaced by fresh catalyst after which normal operations are resumed at acceptable yield levels. The necessity for frequent shutdowns to replace the catalyst and excessive catalyst replacement costs appreciably decrease the practicality of the process for industrial use.

As an alternative to catalyst replacement, reactivation or regeneration of the catalyst has been attempted. While several methods have been developed for regeneration of supported catalysts, these are generally unsatisfactory for use with gauze catalysts because they require removal of the catalyst from the reactor and do not circumvent the down time or loss in production. Also, the gauzes are very easily damaged mechanically and only very minor injuries sustained in handling can result in significant losses in catalytic activity. The advantages of a method, therefore, which requires no physical handling of the gauze catalyst and which can be conveniently conducted in the reactor as a cycle in the regular synthesis operation are immediately obvious.

It is an object of the present invention to provide an improved unitary process for the production of hydrogen cyanide by reacting a nitrogen-containing gas such as ammonia with a hydrocarbon such as methane and oxygen or oxygen-containing gases in contact with a platinum-containing gauze metal catalyst whereby the yields of hydrogen cyanide per unit of catalyst are maintained at an optimum level.

It is another object of the invention to increase the useful life of a platinum-containing gauze catalyst.

Still another object of the invention is to improve the activity of a platinum-containing gauze catalyst for the synthesis of hydrogen cyanide which has undergone loss in activity during use.

A still further object of the invention is to provide an "in situ" method of regenerating a platinum-containing gauze catalyst for the synthesis of hydrogen cyanide in the reactor which can be readily integrated with the synthesis reaction to yield a unitary process in which the usual disadvantages of down-time, excess catalyst expense and operational difficulties of the conventional process are substantially eliminated.

Other objects and advantages of the invention will be apparent to one skilled in the art from the accompanying description and discussion.

The foregoing objects are attained by continuously passing a feed mixture of a nitrogen-containing gas, a hydrocarbon, and an oxygen-containing gas in the proportions required to produce hydrogen cyanide through a platinum-containing gauze catalyst disposed in a reaction zone at a temperature within the range from about 500° C. to about 1300° C. for a period of time until a predetermined level of yield of hydrogen cyanide is obtained, discontinuing the passage of said feed mixture through said catalyst, immediately passing air at atmospheric pressure through said catalyst until the temperature at a level in the reaction zone about ½ inch below said catalyst drops to about 350° C., passing hydrogen or a mixture of hydrogen and nitrogen at atmospheric pressure through said catalyst until the temperature in the reaction zone about ½ inch below said gauze catalyst drops to about 150° C. and thereafter passing a gaseous feed mixture of a nitrogen-containing gas, a hydrocarbon, and an oxygen-containing gas in the proportions required to produce hydrogen cyanide through said catalyst whereby said feed mixture is ignited without lighting-off by the heat contained in the gauze catalyst and the reaction proceeds to produce hydrogen cyanide. In the preferred embodiment of the invention, the nitrogen-containing gas is ammonia, the hydrocarbon is methane and the oxygen-containing gas is air.

The invention is illustrated in the following examples which, however, are not to be construed as limiting it in any manner whatsoever.

EXAMPLE 1

The apparatus employed was a scale model of the conventional reaction system employed in the industrial production of hydrogen cyanide. It consisted essentially of a feed gas manifold, a reactor or converter, and a heat-exchanger attached directly below the reactor. The reactor, a vertical tube 4 inches in diameter, contained two packs of wire gauze made of a platinum-rhodium alloy containing 90% platinum and 10% rhodium cut in circular shape. Each pack consisted of 3 layers of the 80- mesh, 3-mil gauze. Ammonia, air and methane were charged through calibrated rotameters at rates to provide a feed mixture in which the ratio of ammonia to methane was in the range from about 0.750 to 0.985 and the ratio of methane to air was in the range from 0.094 to 0.109 and the mixture was passed through the catalyst in the reactor at a rate from about 75–100 lb./hr. and a pressure of about 14 p.s.i.g. The reaction was initiated by contacting the catalyst with a platinum-loop igniter heated electrically. Reaction temperature in the reactor was about 1000° C. The effluent gases from the reactor passed directly into the heat exchanger where they were quenched. After operation for a sufficient length of time to reach equilibrium conditions, samples of the off-gas were collected and analyzed for hydrogen cyanide. Presented in Table I below are the results of a series of runs using the same catalyst over an extended period of time. These demonstrate clearly the pattern of catalytic activity indicating that a certain period of activation occurs during which the catalyst reaches a peak activity with this activity steadily diminishing upon continued use.

*Table I*

| Run Time (Hr.) | Yield of Hydrogen Cyanide (Mol percent) |
|---|---|
| 25 | 63.9 |
| 37 | 66.1 |
| 48 | 69.2 |
| 70 | 70.5 |
| 205 | 62.8 |
| 282 | 61.2 |
| 350 | 57.6 |

EXAMPLE 2

Another series of runs was conducted wherein ammonia, methane and air were reacted using the same catalyst and conditions recited in Example 1 except that in between each run the catalyst was subjected to a reactivation or regeneration treatment. The feed gases to the reactor were cut off and immediately thereafter the hot gauze catalyst was purged with air at atmospheric pressure for periods of time ranging from about 10 min. to about 12 hr. In the first two runs, the air employed was preheated to a temperature from 100° C. to about 250° C. In the remainder of the regeneration treatments, air at room temperature was employed. After the treatment with air, the feed mixture was again passed through the catalyst for the indicated periods of time. Results of these runs are presented in Table II.

*Table II*

| Regeneration Period (Hr.) | Run Time (Hr.) | Yield of Hydrogen Cyanide (Percent) |
|---|---|---|
| 1.5 | 6 | 56.9 |
| 12 | 19 | 57.5 |
| 1.0 | 6 | 55.4 |
| 1.16 | 6 | 55.6 |
| 1.5 | 6 | 55.7 |
| 1.16 | 18.5 | 55.7 |
| 0.33 | 6 | 55.7 |

EXAMPLE 3

A third series of runs was conducted under the conditions recited in Example 1. A spent catalyst (previously used in Examples 1 and 2 and in subsequent runs) which gave a yield of hydrogen cyanide of 45.1% when last used was treated between runs by purging with air at room temperature immediately after the feed gases were cut off until the temperature in the reactor ½ inch below the catalyst registered about 350° C., then purging with a mixture of nitrogen and hydrogen containing amounts of hydrogen varying from 20 to 90% at atmospheric pressure until the temperature about ½ inch below the catalyst dropped to about 150° C. The feed gas mixture was then passed through the catalyst. Results of these runs are tabulated in Table III.

*Table III*

| Regeneration with Air (Min.) | Regeneration with $H_2$ or Mixt. $H_2$ and $N_2$ (Hr.) | Run Time (Hr.) | Yield of Hydrogen Cyanide (Percent) |
|---|---|---|---|
| --------- | --------- | --------- | 45.1 |
| 2 | 1.5 | 6 | 51.3 |
| 3 | 1.25 | 6.5 | 61.0 |
| 3 | 0.75 | 7 | 58.9 |
| 3 | 0.33 | 7.5 | 60.5 |
| 2 | 1.25 | 6 | 60.0 |

It will be observed from the data in the foregoing tables that regeneration of the platinum-containing gauze catalyst for synthesis of hydrogen cyanide using air alone through the hot gauze prevents further deterioration of the catalyst and provides for maintaining it at a given level of activity. When, however, treatment with air is supplemented by treatment with hydrogen a significant improvement, i.e., an increase in yield from about 45% to about 60%, in the activity of the catalyst is brought about.

Many variations in conditions from those given in the example can be made without departing from the scope of the invention. While the reaction mixture preferred for the synthesis of hydrogen cyanide is a mixture of ammonia, natural gas and air, it is to be understood that the process of the invention may be employed with mixtures of nitric oxide and hydrocarbons; ammonia, methane, and oxygen; and other mixtures of gases comprising nitrogen compounds, oxygen and carbon compounds including hydrocarbons and carbon oxides.

The proportions of reactants employed are not wholly critical but should be held within certain limits. The ratio of hydrocarbon and ammonia may be varied within comparatively wide limits. In order to make the reaction exothermic, the quantity of oxygen employed must amount to about 10% by volume of the sum of ammonia and hydrocarbon gas but it must be less than would lead to complete combustion of the ammonia and hydrocarbons to water, carbon dioxide and nitrogen. Good yields are obtained with methane as the hydrocarbon with an amount of oxygen the ratio of which to the sum of ammonia and methane is less than 1. The minimum oxygen-methane ratio is from about 1.1–1.2:1 using an approximation of the optimum amount of ammonia while the upper limit on the same basis is around 1.4–1.5:1. In practical operation the ammonia-hydrocarbon ratio should be maintained at about 0.8–1.2:1 with preferred ratios of 0.8–1.0:1 being employed. Optimum conditions depend upon the nature of the catalyst employed, the time of contact of the gaseous mixture with the catalyst and of the composition and nature of the feed gases.

The temperature at which the reaction is conducted varies between 500 and 1300° C. and preferably is maintained between 900 and 1200° C. The reaction is started by heating either the initial gases or the catalyst to reaction temperature or by igniting the gaseous mixture by means of a flame, electric heating wire or the like.

The process may be carried out at any pressure, i.e., at atmospheric, superatmospheric or reduced pressure, but generally about atmospheric pressure is preferred with gauze catalysts because of their sensitivity to physical damage.

As mentioned previously, suitable catalysts are those containing platinum and preferably those containing platinum in conjunction with another noble metal such as iridium, palladium and especially rhodium. The catalyst is employed in the form of a gauze and the gauze structure may be varied as desired.

With an efficient catalyst, the contact time may be extremely short, for example, less than 0.001 second. Generally, contact times from 0.001 to about 0.002 second at reaction temperature are employed.

In the treatment of the spent catalyst with air, air at atmospheric temperature is preferred although the air may be preheated if desired. If preheating is employed, air temperatures of from about 100° C. to about 250° C. are used. The air may be replaced by oxygen if desired. The treatment with air is only a brief one and is discontinued as soon as the temperature at a level in the reactor or reaction zone ½ inch below the gauze catalyst drops to around 350° C. This requires from about 1 to about 5 minutes.

While the examples show the use of mixtures of hydrogen and nitrogen containing amounts of hydrogen varying from 20% to 90%, practical experience has shown that nitrogen alone has no effect on the catalyst merely serving as a diluent gas. Hence, pure hydrogen can be employed in this step if desired. Frequently, mixtures of hydrogen and nitrogen are available such as ammonia synthesis gas, for example, and this is a convenient source of a treating gas suitable in this regeneration step. The treatment of the hot gauze catalyst with hydrogen or with a hydrogen-containing gas is also conducted at atmospheric pressure and preferably with the treating gas at ambient temperature. The use of pressure in this or in the air-treating step is not suitable because it is believed to result in injury to the physical structure of the catalyst. The hydrogen is passed through the catalyst until the temperature at a level in the reactor or reaction zone ½ inch below the gauze drops to 150° C. This requires a period of time from about 0.25 to about 1.5 hours.

One of the main advantages of the regeneration technique of the inventive process is that after treatment with air followed by hydrogen, the residual heat in the catalyst is sufficient to ignite the reactant mixture as soon as the hydrogen gas flow is discontinued and the reactant gases are again introduced into the reaction zone. Thus, the process of synthesis and regeneration can be conducted expeditiously in a cyclic manner without necessitating removal of the catalyst from the reactor or requiring accessory equipment.

What is claimed is:

1. An improved process for the production of hydrogen cyanide which comprises passing a feed mixture of ammonia, methane, and air in the proportions required to produce hydrogen cyanide through a metallic gauze catalyst selected from the group consisting of gauzes of platinum and of platinum in admixture with a noble metal selected from the group consisting of iridium, palladium and rhodium disposed in a reaction zone at a temperature within the range from about 500° C. to about 1300° C. for a period of time until an unsatisfactory level of yield of hydrogen cyanide is obtained, discontinuing passage of said feed mixture through said catalyst, immediately passing air at atmospheric pressure through said catalyst until the temperature at a level in the reaction zone about ½ inch below said catalyst drops to about 350° C., passing hydrogen at atmospheric pressure through said catalyst until the temperature in the reaction zone about ½ inch below said gauze catalyst drops to about 150° C., and thereafter passing a gaseous feed mixture of ammonium, methane, and air in the proportions required to produce hydrogen cyanide through said catalyst whereby said feed mixture is ignited by the heat contained in said catalyst and the reaction proceeds to produce hydrogen cyanide.

2. The process of claim 1 wherein said catalyst is a platinum-rhodium gauze.

3. The process of claim 2 wherein the ratio of ammonia to methane is in the range from about 0.750 to about 0.985 and the ratio of methane to air is in the range from about 0.094 to about 0.109.

References Cited by the Examiner

UNITED STATES PATENTS

| 2,496,999 | 2/1950 | Houpt et al. | 23—151 |
| 2,792,337 | 5/1957 | Engel | 252—416 |
| 3,093,597 | 6/1963 | Hill et al. | 252—411 |

OSCAR R. VERTIZ, *Primary Examiner.*

MAURICE BRINDISI, *Examiner.*

E. C. THOMAS, *Assistant Examiner.*